(12) United States Patent
Hayes

(10) Patent No.: US 11,214,968 B2
(45) Date of Patent: Jan. 4, 2022

(54) APPARATUS FOR HANGING DOORS

(71) Applicant: Robert Stanley Hayes, Withcott (AU)

(72) Inventor: Robert Stanley Hayes, Withcott (AU)

(73) Assignee: Robert Stanley Hayes, Withcott (AU)

( * ) Notice: Subject to any disclaimer, the term of this patent is extended or adjusted under 35 U.S.C. 154(b) by 168 days.

(21) Appl. No.: 16/303,133

(22) PCT Filed: May 30, 2017

(86) PCT No.: PCT/AU2017/050513
§ 371 (c)(1),
(2) Date: Nov. 19, 2018

(87) PCT Pub. No.: WO2017/205913
PCT Pub. Date: Dec. 7, 2017

(65) Prior Publication Data
US 2019/0284822 A1   Sep. 19, 2019

(30) Foreign Application Priority Data

Jun. 3, 2016   (AU) .............................. 2016/902138

(51) Int. Cl.
*E04F 21/00*   (2006.01)
*B66F 3/08*   (2006.01)
(Continued)

(52) U.S. Cl.
CPC ............ *E04F 21/0023* (2013.01); *B62B 3/06* (2013.01); *B66F 3/08* (2013.01); *B66F 15/00* (2013.01); *E04F 21/00* (2013.01)

(58) Field of Classification Search
CPC ...... B66F 7/10; B66F 7/12; B66F 7/14; B66F 3/08; B66F 3/18; B66F 9/02; B66F 3/36;
(Continued)

(56) References Cited

U.S. PATENT DOCUMENTS 2,598,489 A * 5/1952 Bayer ...................... B62B 1/14
414/467
2,663,929 A * 12/1953 Carpenter ............ B25H 1/0007
269/59
(Continued)

FOREIGN PATENT DOCUMENTS

CN        103407929        11/2013
GB          2225769         6/1990

OTHER PUBLICATIONS

Written Opinion for PCT/AU2017/050513 dated Jul. 26, 2017; 6 pps.
(Continued)

*Primary Examiner* — Lee D Wilson
*Assistant Examiner* — Robert F Neibaur
(74) *Attorney, Agent, or Firm* — RowanTree Law Group, PLLC; Magdalena M. Fincham

(57) ABSTRACT

A door hanging apparatus includes a base for ground contact. A height adjustment bracket is located above the base and includes a lifting platform for supporting an underside of a door. A leadscrew assembly, including a leadscrew, interconnects the base and the height adjustment bracket. The leadscrew assembly operates to vary spacing between the base and the height adjustment bracket in response to rotation of the leadscrew.

17 Claims, 15 Drawing Sheets

(51) Int. Cl.
 *B66F 15/00* (2006.01)
 *B62B 3/06* (2006.01)
(58) Field of Classification Search
 CPC .. B25B 3/00; B25B 1/10; B25B 5/147; B25B
  5/142; B25B 5/14; B25B 5/10; B25B
  5/02; B25B 27/023; B23Q 3/00; B23Q
  3/06; E04F 21/0023; E04F 21/0007; E04F
  19/08; H01L 21/68742; H01L 21/68764;
  H01L 21/68785; Y10T 29/53861
 USPC ............................ 269/3, 60, 28; 29/255, 278
 See application file for complete search history.

(56) References Cited

U.S. PATENT DOCUMENTS

| | | | |
|---|---|---|---|
| 2,737,709 A * | 3/1956 | Lovelace | B66F 3/44 |
| | | | 269/47 |
| 2,739,784 A | 3/1956 | Thompson et al. | |
| 4,043,536 A * | 8/1977 | Almond | B62B 1/268 |
| | | | 254/2 R |
| 4,278,244 A * | 7/1981 | Carter | B25B 5/142 |
| | | | 269/152 |
| 4,492,014 A * | 1/1985 | Alexander | B25B 27/023 |
| | | | 29/259 |
| 4,492,369 A | 1/1985 | Pohl | |
| 4,908,925 A * | 3/1990 | Johnson | B25B 27/023 |
| | | | 29/244 |
| 6,022,008 A | 2/2000 | Bachman | |
| 6,530,740 B2 * | 3/2003 | Kim | B62B 1/002 |
| | | | 180/251 |
| 6,722,643 B1 * | 4/2004 | Kurtz | B25B 5/10 |
| | | | 269/249 |
| 8,517,342 B2 * | 8/2013 | Dunca | B66F 15/00 |
| | | | 254/131 |
| 8,556,280 B1 * | 10/2013 | Latimer | B62B 1/125 |
| | | | 280/47.29 |
| 9,320,357 B1 * | 4/2016 | Tian | B25H 1/10 |
| RE47,616 E * | 9/2019 | Murphy | B62B 1/12 |
| 2006/0097235 A1 | 5/2006 | Wu | |
| 2007/0251018 A1* | 11/2007 | Razzaghi | B66F 3/44 |
| | | | 7/100 |
| 2012/0193590 A1 | 8/2012 | Horwath et al. | |

OTHER PUBLICATIONS

International Search Report for PCT/AU2017/050513 dated Jul. 26, 2017; 4 pps.
Office Action for Chinese Application No. 201780049074.6 dated Mar. 23, 2020; 9pps.

* cited by examiner

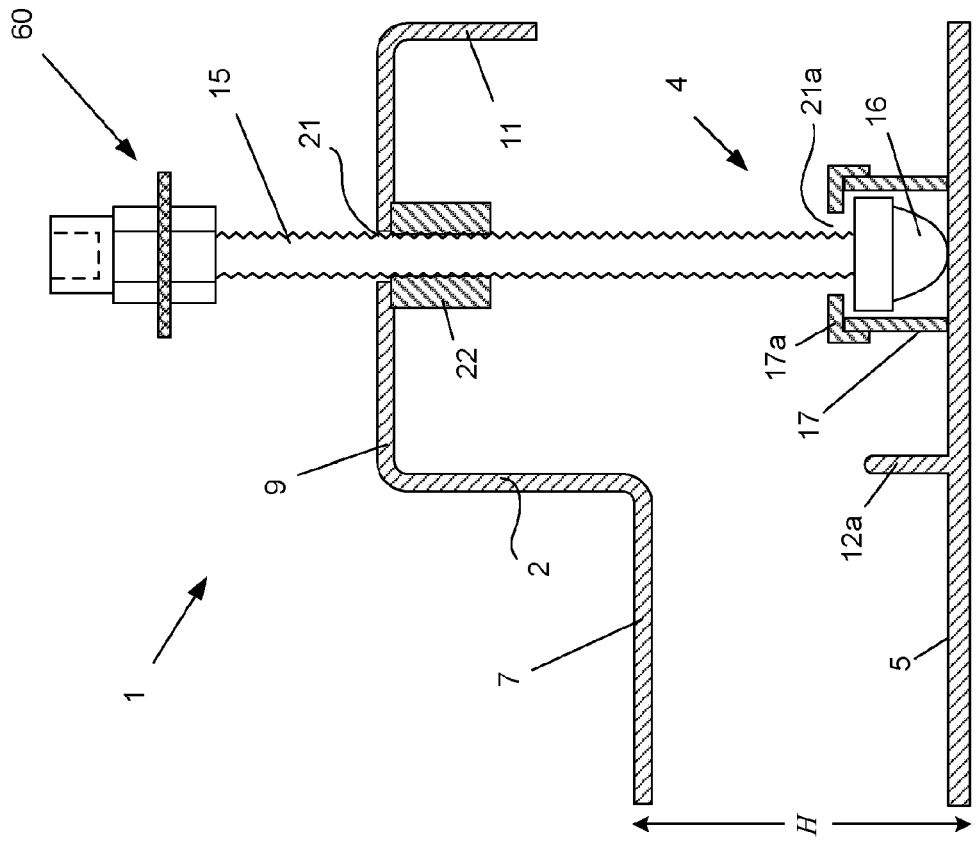
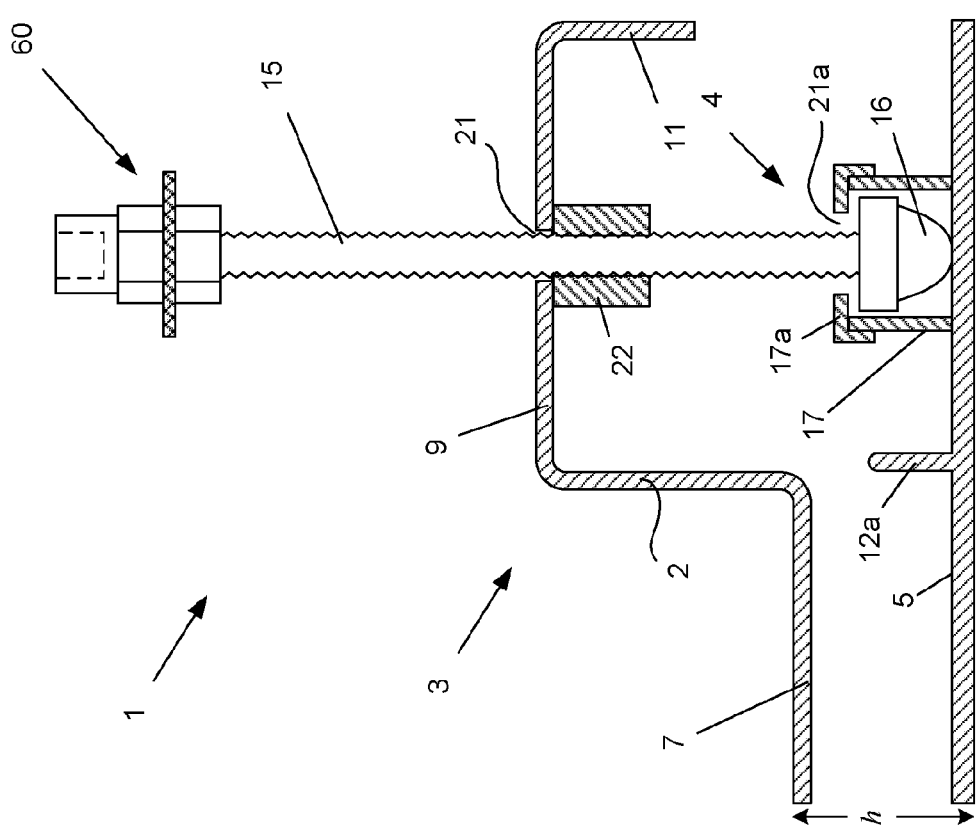

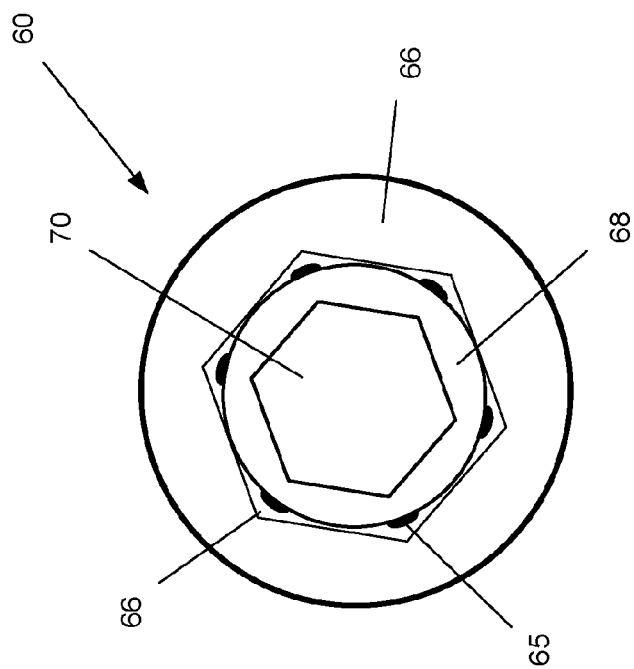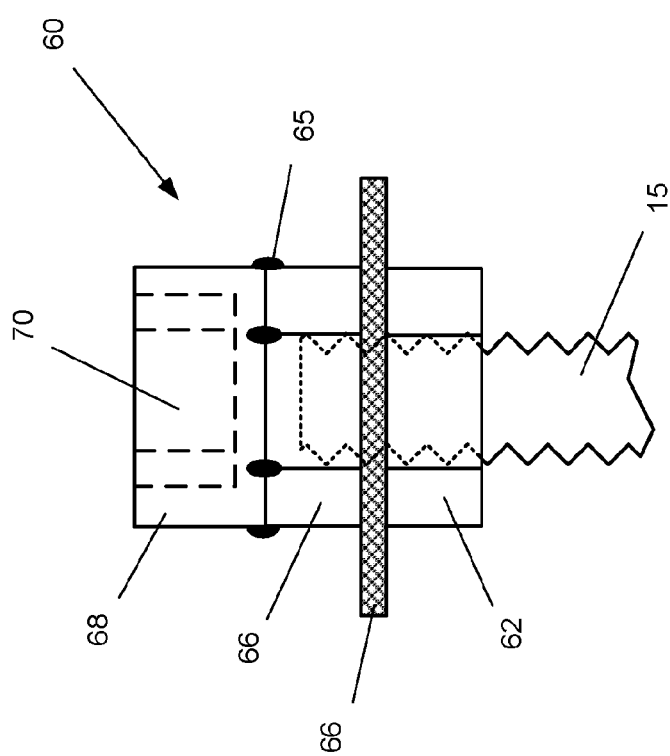
FIG. 11B
FIG. 11A

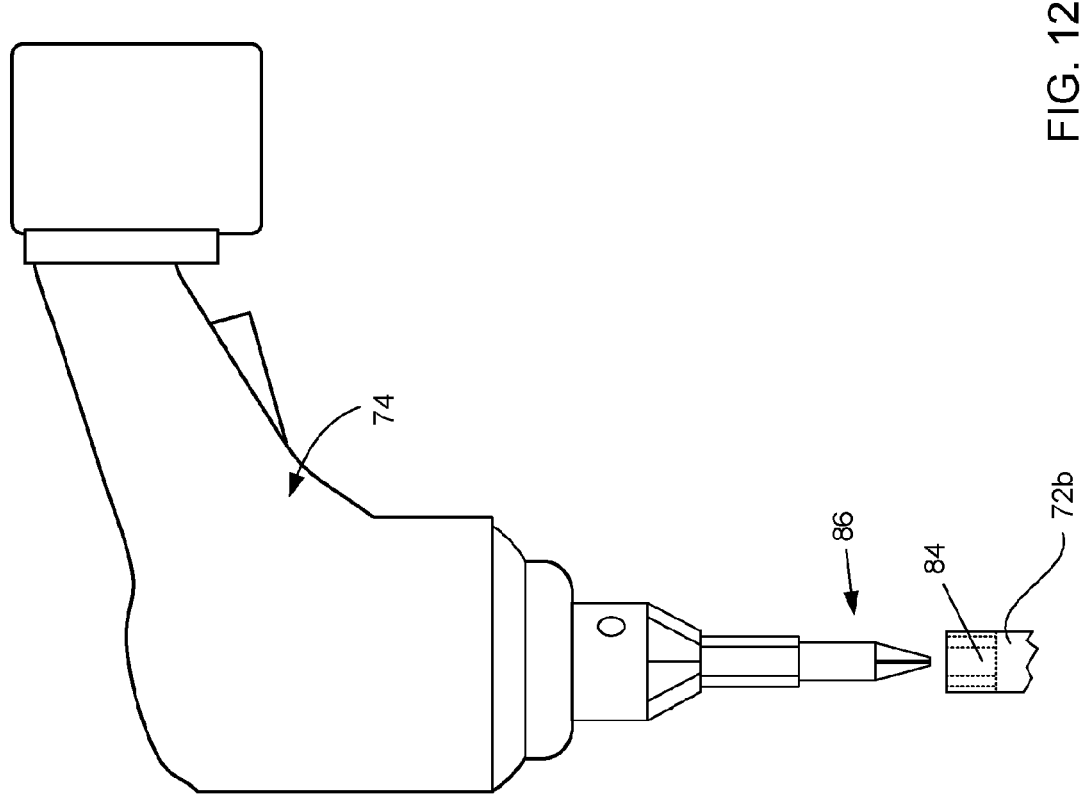

APPARATUS FOR HANGING DOORS

TECHNICAL FIELD

The present invention concerns apparatus for assisting in the hanging of doors in commercial and domestic situations. Such apparatus include door jacks, levers, and other arrangements for raising and lowering doors.

BACKGROUND

Any reference to methods, apparatus or documents of the prior art are not to be taken as constituting any evidence or admission that they formed, or form part of the common general knowledge.

Builders and handymen and handywomen may be required to hang a door or as it is sometimes called a "leaf" in a door frame. In order to successfully hang a door it is necessary to raise the door so that the door hinge is brought adjacent to a position on the frame for fixing thereto. In the correct position there will be a small clearance between the top of the door and the header of the doorframe.

Bringing the door to the correct position is an unwieldy task. The door is somewhat heavy and it must be kept substantially vertical and parallel with the doorframe. For a person working by themselves the task of bringing the door to the correct position and fastening the hinge to the frame is fiddly and verging on dangerous. If the door is dropped then it may be damaged and there is a risk that the worker could be injured.

Various apparatus to assist in positioning a door for hanging the door within a frame are known. At its most basic level it is known for tradespersons to position a lever such as an old chisel for example beneath the door and by positioning their foot underneath the handle of the chisel to raise and lower the door. However this approach is fraught with difficulties as it relies almost entirely on the correct application of force from the tradesperson's foot to the handle of the lever in order to force the shaft of the lever against the underside of the door and thereby raise it to the desired height. It is uncomfortable to operate in this manner and furthermore it may damage the underside of the door and almost certainly the chisel.

Dedicated levers specially designed for assisting in the raising of a door for the purposes of hanging it within a doorframe are also known. These apparatus typically include a base upon which an L shaped lever is pivoted through the angle of the L. In order to operate such an apparatus the tradesperson presses down on one end of the lever whilst the other abuts the underside of the door. Once again the accurate control of the raising and lowering of the door is difficult with this apparatus because it relies upon the gross motor skills of the leg of the person applying force to the lever.

It is an object of the present invention to provide a door hanging apparatus which can be finely controlled, is stable and configured to be readily operated.

SUMMARY OF THE INVENTION

According to a first aspect of the present invention there is provided a door hanging apparatus including:
a base for ground contact;
a height adjustment bracket located above the base and including a lifting platform for supporting an underside of a door; and
a leadscrew assembly interconnecting the base and the height adjustment bracket arranged to vary spacing between the base and the height adjustment bracket in response to rotation of a leadscrew of the leadscrew assembly.

Preferably the leadscrew assembly includes a thrust collar fast with the base which receives a point of the leadscrew wherein the leadscrew is free to rotate within the thrust collar.

In a preferred embodiment of the invention a point of the leadscrew is capped. Preferably the lifting platform area for supporting the underside of a door is located below a point of coupling of the leadscrew assembly to the height adjustment bracket whereby the screw assembly is operable to bring the lifting platform area down to the base.

In a preferred embodiment of the invention the height adjustment bracket includes a door abutment face extending at an angle from the lifting platform area.

Preferably the leadscrew is threadedly engaged by a nut fast with the height adjustment bracket.

The base may be of a rectangular shape.

In a preferred embodiment of the invention at least one guidepost extends from the base parallel with the leadscrew through respective openings formed through the height adjustment bracket.

Preferably the at least one guidepost comprises first and second guideposts that extend through first and second guide collars that are fast with the height adjustment bracket and coaxial with the first and second guideposts.

Preferably the apparatus includes an operator handle for operation of the leadscrew assembly.

The operator handle is preferably fast with an extension shaft that couples to the leadscrew assembly.

In a preferred embodiment of the invention the operator handle comprises a disk fast with the leadscrew.

Preferably an upper end of the leadscrew terminates in a coupling assembly.

The coupling assembly may be attached to an extension shaft assembly.

Preferably the extension shaft assembly includes a cushioning member.

The extension shaft assembly may include a socket for driving by a power drill.

The extension shaft may be coupled at an angle to the leadscrew by deforming the cushioning member in use.

In one embodiment of the invention the distance from the baseplate to the operator handle is at least 40 cm so that a worker is able to rotate the handle whilst standing.

It is preferred that the height adjustment bracket includes a top plate and has a guard rail extending downwardly from a rear edge of the top plate.

Preferably the apparatus includes one or more clamp support members extending from the base plate towards the height adjustment bracket, for supporting a member to be clamped between the lifting platform and the baseplate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 6 and 7 are partial cross-sectional side views of the door hanging apparatus corresponding to FIGS. 4 and 5.

FIGS. 11A and 11B are side and top plan views respectively of a coupling assembly of the door lifting apparatus.

FIG. 12 is a detailed view of an electric drill and driver bit prior to coupling to an end of the extension shaft.

DETAILED DESCRIPTION OF PREFERRED EMBODIMENTS

Figure 1:
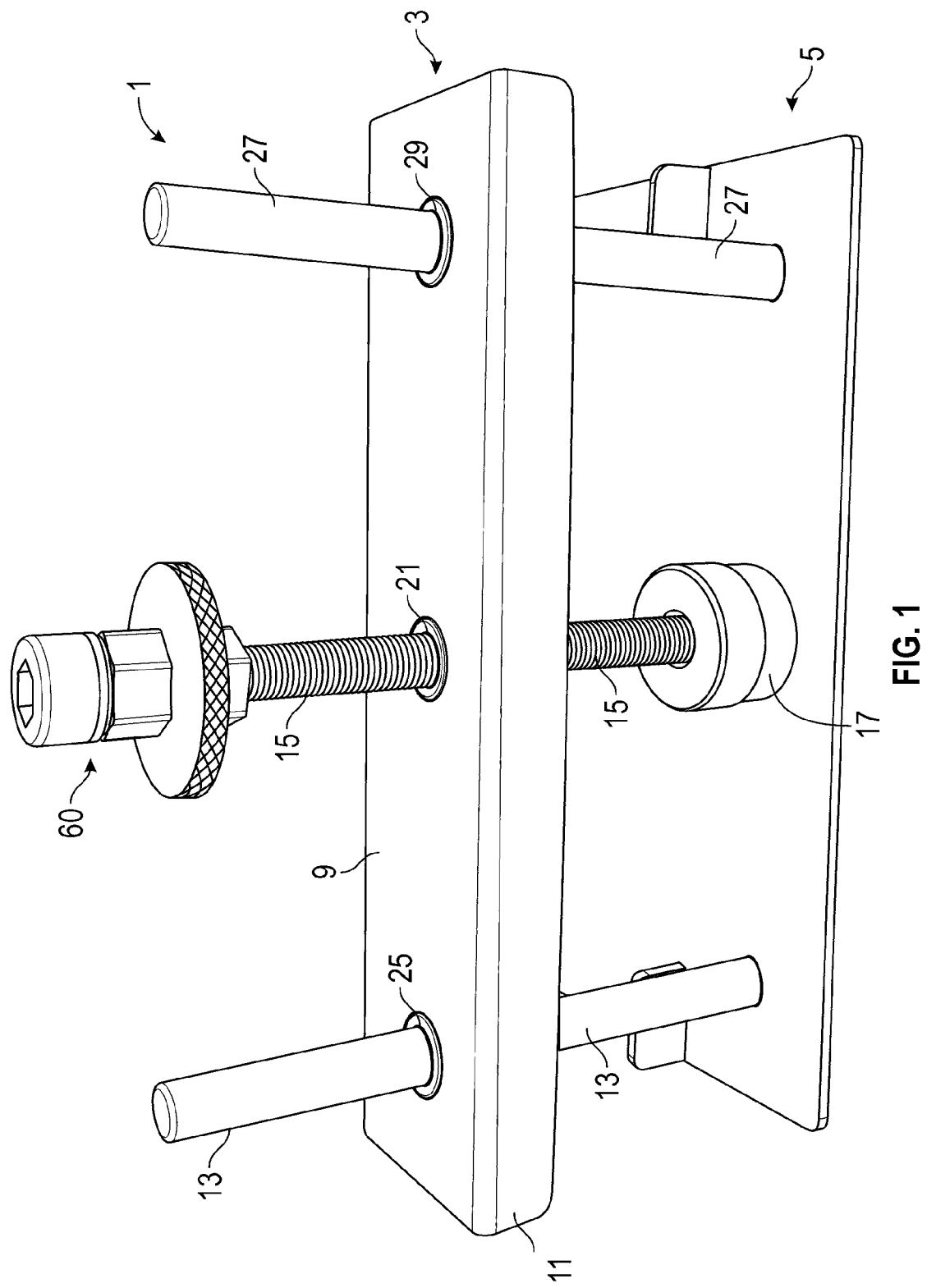
FIG. 1 is a view of the rear and top of a door hanging apparatus according to a preferred embodiment of the present invention.
Figure 2:
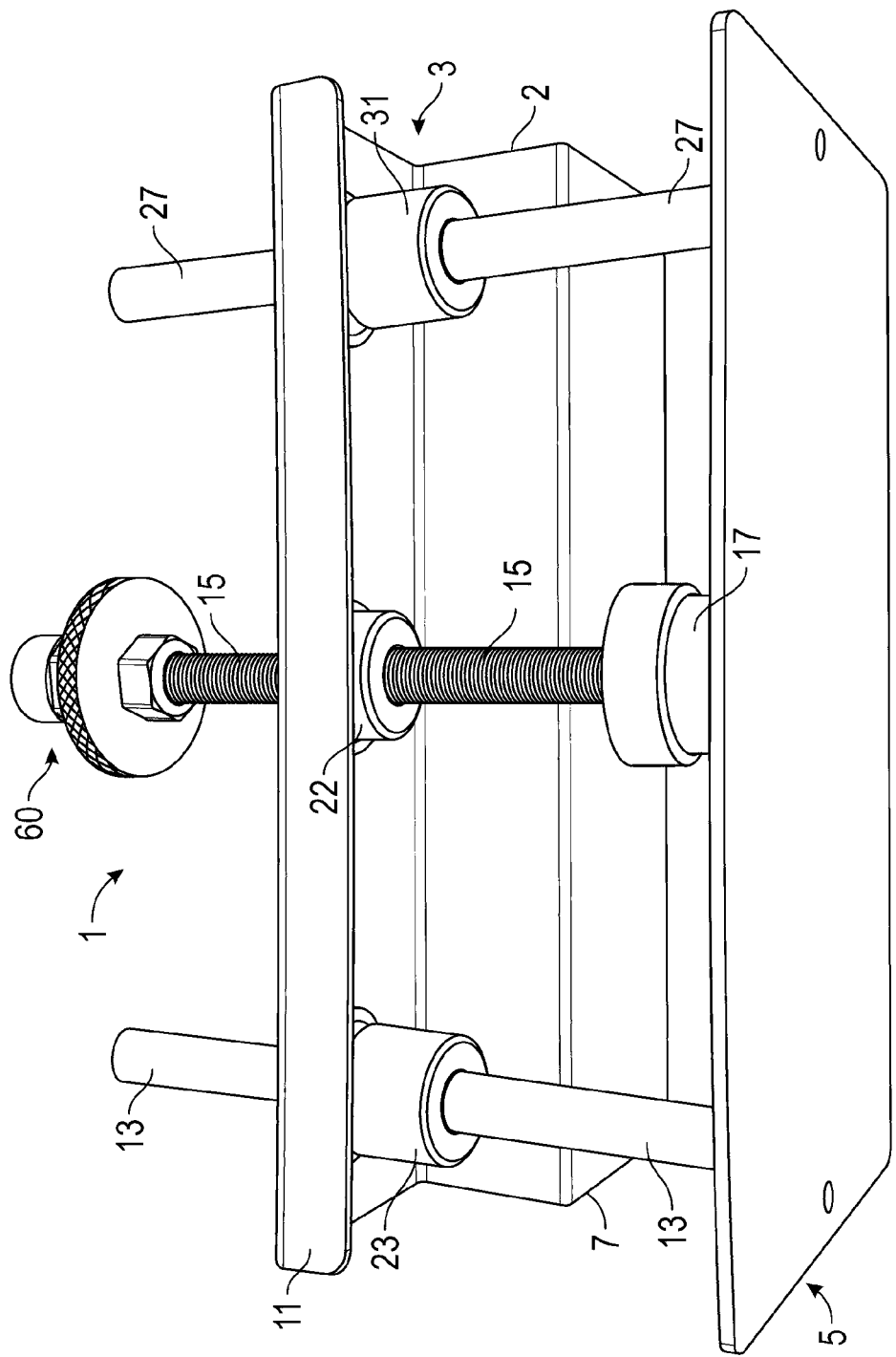
FIG. 2 is a view of the rear and underside of a door hanging apparatus according to a preferred embodiment of the present invention.
Figure 3:
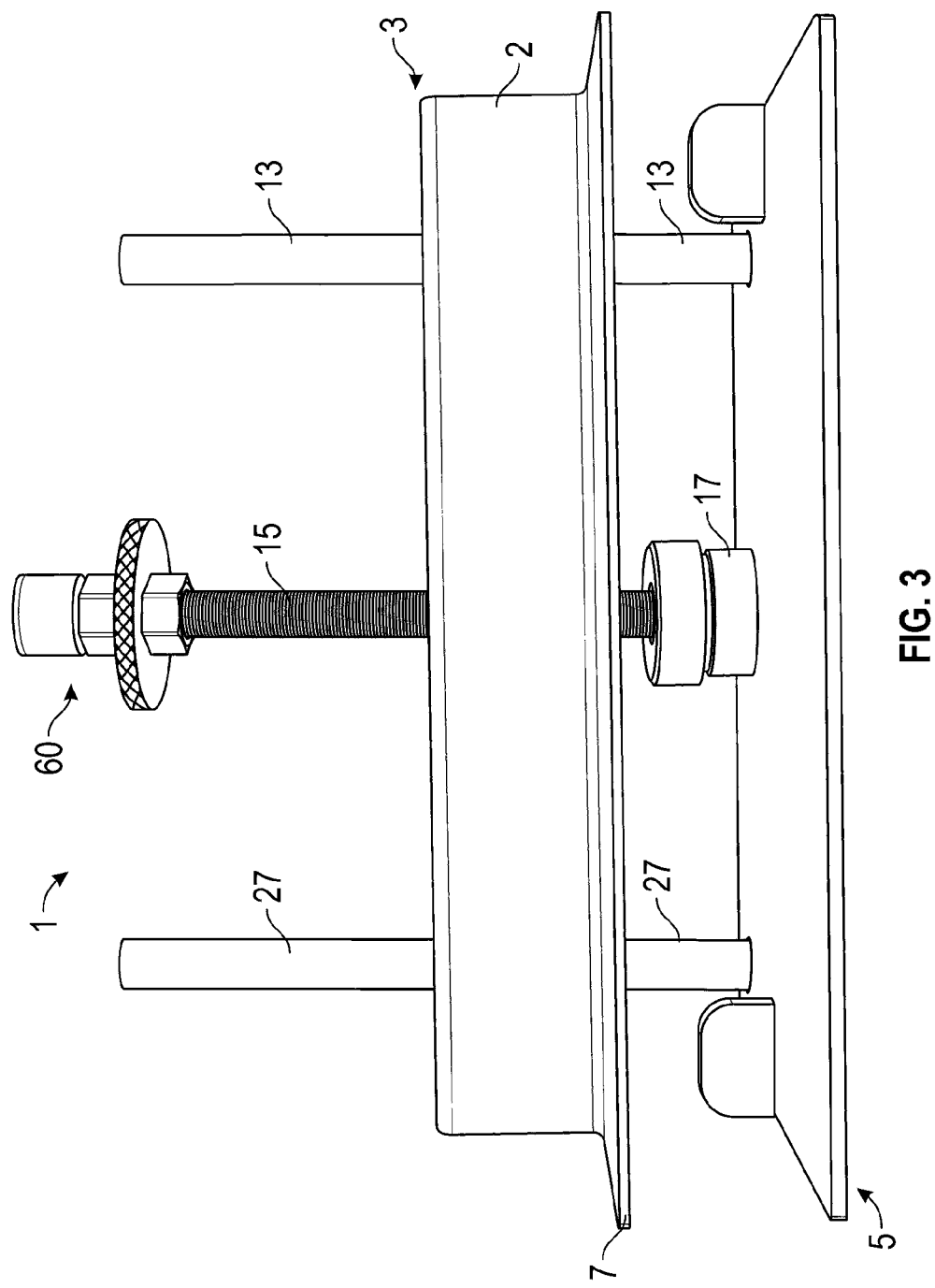
FIG. 3 is a view of the front of a door hanging apparatus according to a preferred embodiment of the present invention.

FIGS. 1 to 3 comprise various views of a door hanging apparatus 1 according to a preferred embodiment of the present invention. The apparatus 1 includes a rectangular base 5 for ground contact on a surface, such as a floor, adjacent to a doorframe for hanging of a door in use.

Above the rectangular base 5 there is located a height adjustment bracket 3. Preferably the height adjustment bracket and the base are made of sheet metal such as 3 mm galvanized steel though other suitably strong and rigid materials may also be used. The height adjustment bracket 3 is shaped so that it has a leading, horizontal lifting platform 7 for supporting the lower edge of a door in use. Rearwardly the lifting platform 7 connects to a vertical door abutment face 2 that in use assists in stabilizing the lower edge of the door. The door abutment face 2 extends upwardly to connect with a leading edge of a horizontal top plate 9. A guard rail 11 extends vertically downward from the trailing edge of the top plate 9. The guard rail 11 guards the leadscrew 15 from the rear and also strengthens the top plate 9. As will subsequently, discussed with reference to FIG. 7B, the guard rail also provides a support surface for the apparatus when it is used as a clamp.

Figure 4:
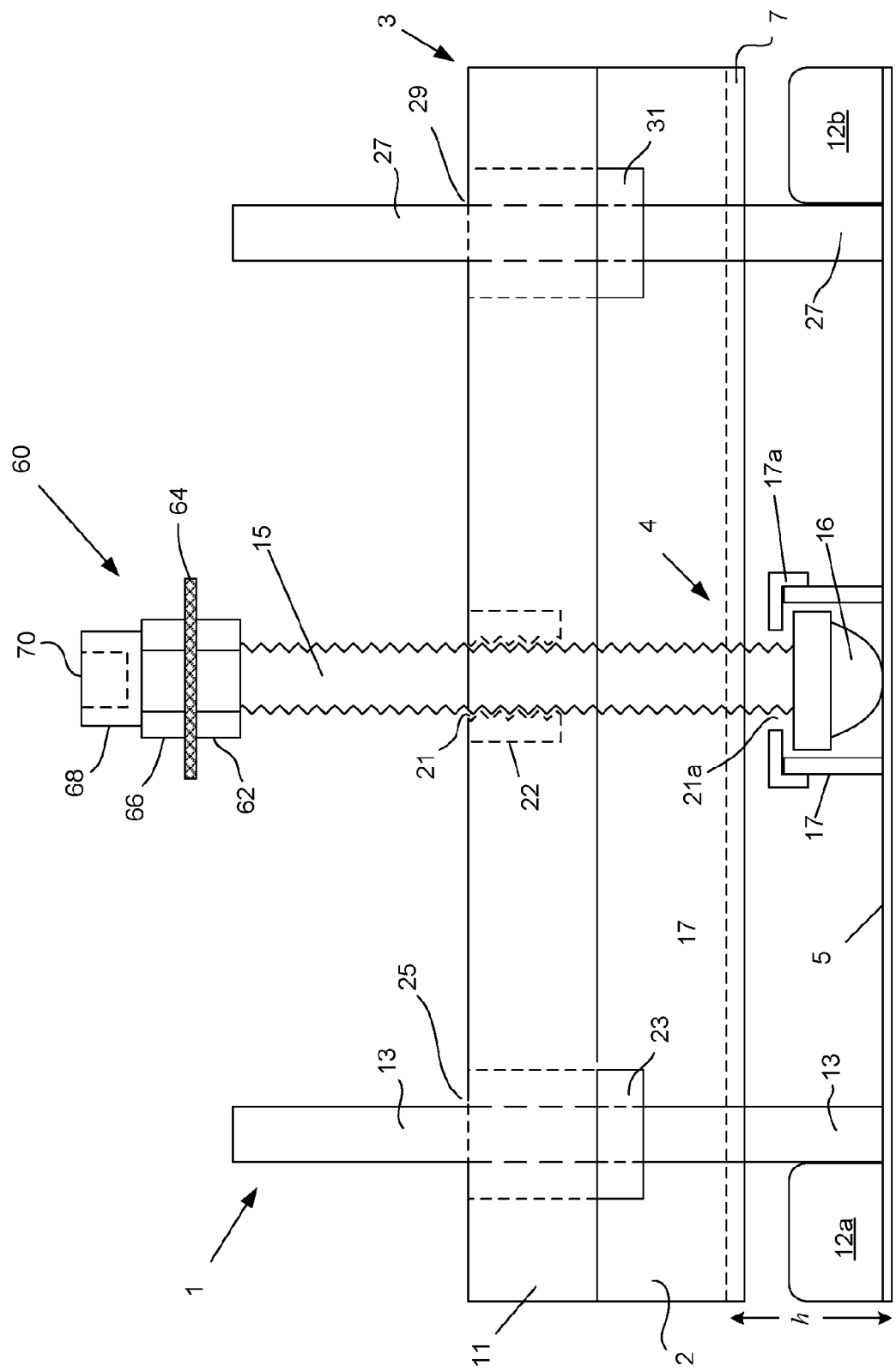
FIGS. 4 and 5 are partially cutaway rear views of the apparatus of FIGS. 1 to 3 at two different door support levels.

The base 5 and the height adjustment bracket 3 are interconnected by a leadscrew assembly 4 (indicated in FIG. 7). The leadscrew assembly 4 comprises a thrust collar 17 which extends upwardly from the baseplate 5. The leadscrew assembly further comprises a leadscrew 15 the point of which is received into thrust collar 17. The leadscrew 15 terminates in a friction reduction cap 16. The cap 16, and thus also the leadscrew 15, is free to rotate within the thrust collar 17. FIG. 4 is a rear view of the door hanging apparatus 1 wherein the thrust collar 17 is shown partially cutaway in order to reveal the point of the leadscrew 15 within.

The thrust collar 17 has a lid 17a that is threadedly attached to the collar and which has a hole 21a, through which the leadscrew 15 passes. Upwardly the leadscrew 15 passes through a hole 21 formed through the top plate 9 of the height adjustment bracket 3. A nut 22 with a threaded bore therethrough is welded to the underside of the height adjustment bracket 3 coaxial with the hole 21. The nut 22 comprises a further component of the leadscrew assembly 4 and threadedly engages the leadscrew 15 which passes there through.

An upper end of the leadscrew 15 is formed with a coupling assembly 60 for coupling the leadscrew 15 to an extension shaft 72 (shown in FIG. 10) as will be explained in more detail subsequently. The coupling assembly 60, which is shown in detail side and top views in FIGS. 11A and 11B) includes a lower lock nut 62, a hand operation disk 64 and an upper lock nut 66, all of which are threadedly received on the leadscrew 15. A head nut 68 is fastened to the top of the upper lock nut 66 by welds 65. The head nut 68 is formed with hexagon shaped socket 70 for receiving a hex rod 82 of the extension shaft 72.

As best seen in FIGS. 1 to 5, first and second guideposts 13 and 27 extend rigidly from the baseplate 5 on either side of the thrust collar 17. The first and second guideposts 13 and 27 proceed through respective holes 25 and 29 (indicated in FIG. 1) formed through the top plate 9 of the height adjustment bracket 3. First and second guide collars 23 and 31 are provided which are fast with the top plate 9 of the height adjustment bracket 3 and coaxial with the first and second guide posts 13 and 27. The first and second guide collars 23, 31 assist in maintaining the height adjustment bracket 3 parallel with the baseplate 5 as the leadscrew 15 is rotated to vary the height of the height adjustment bracket 3 relative to the baseplate 5.

Figure 7A:
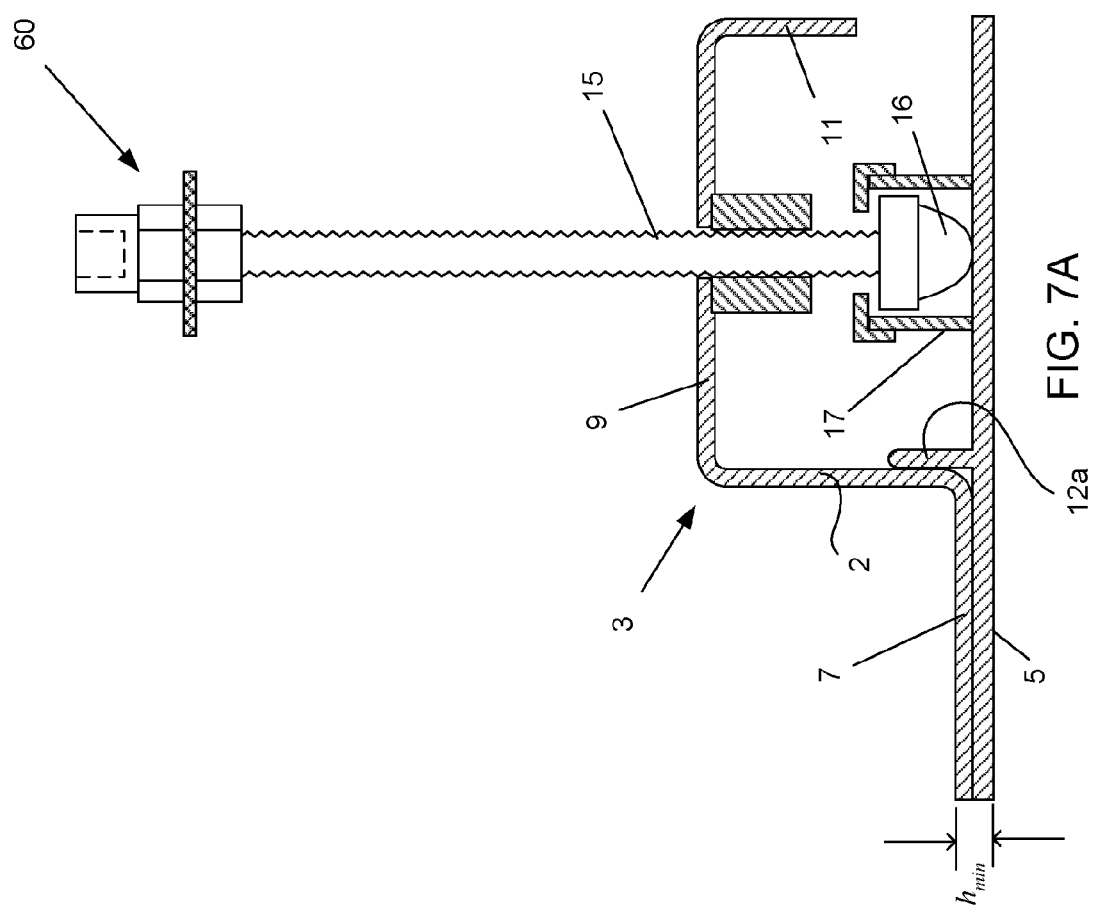
FIG. 7A is a partial cross-sectional side view of the door hanging apparatus wherein the base and height adjustment bracket have been brought together.
Figure 7B:
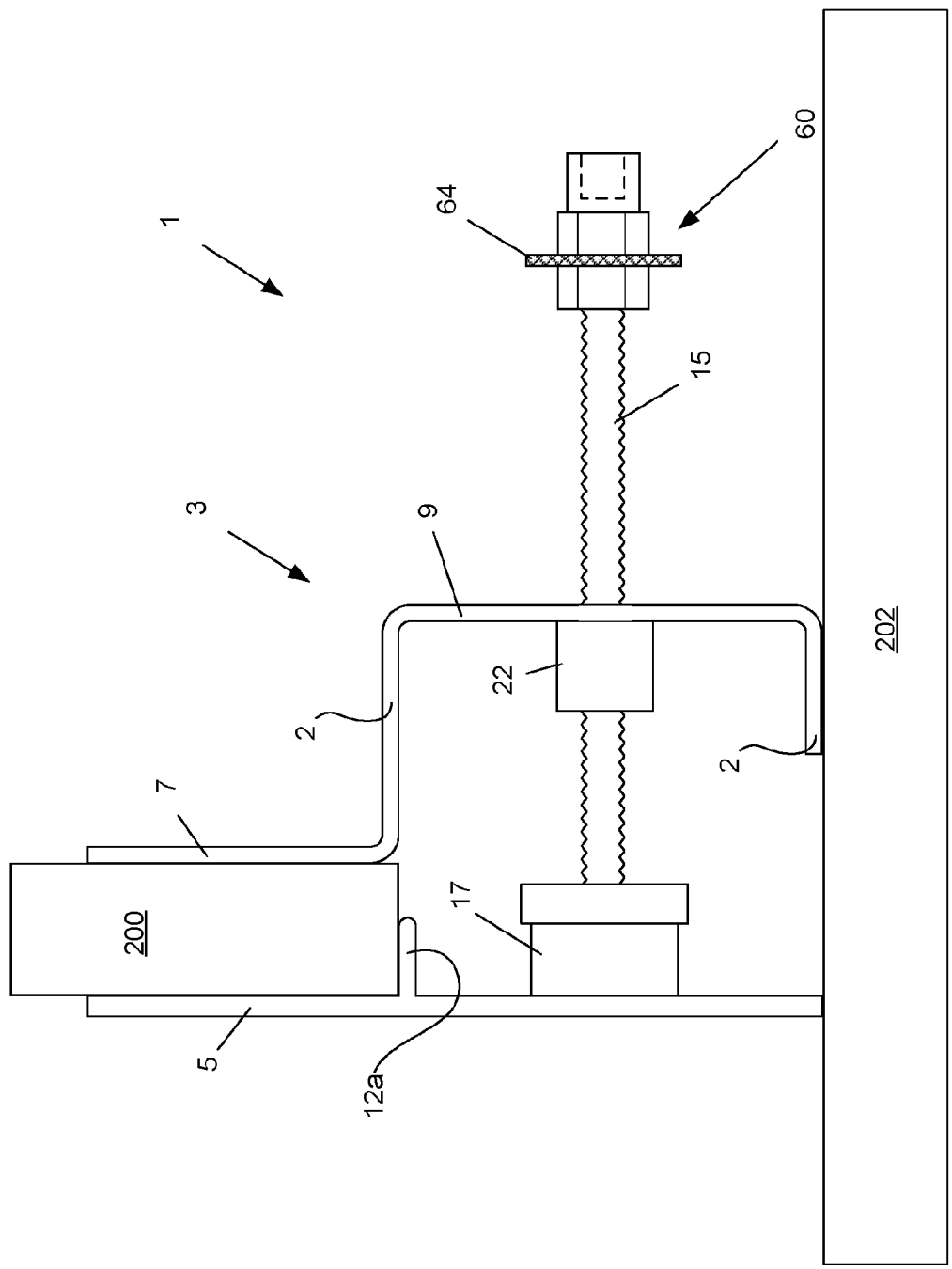
FIG. 7B is a side view of the apparatus in use as a clamp for clamping a member.

First and clamp supports 12a, 12b extend upwardly from the base plate 5. As best seen in FIG. 7A, the clamp supports 12a, 12b are located a little behind the door abutment face 2 when the height adjustment bracket 3 is brought to its lowest position. With reference to FIG. 7B, it is possible to use the apparatus 1 as a portable clamp. In FIG. 7B the apparatus is shown rotated through 90 degrees so that the rear end of base plate 5 and the guard rail 11 rest upon a support surface, e.g. a floor, 202. In this orientation a member for clamping, such as a piece of timber 200 may be inserted between the opposed inner surfaces of the lifting platform 7 and the baseplate 5. The clamp supports 12a, 12b, assist in supporting the member to be clamped 200 as the knurled operator disk 64 is turned to compress the member 200 between the lifting platform 7 and the baseplate 5. The clamped member 200 may then be readily worked such as planed or sawn as required. Accordingly, the apparatus 1 may be used as a convenient and readily transportable clamp for small jobs associated with the hanging of a door.

Figure 5:
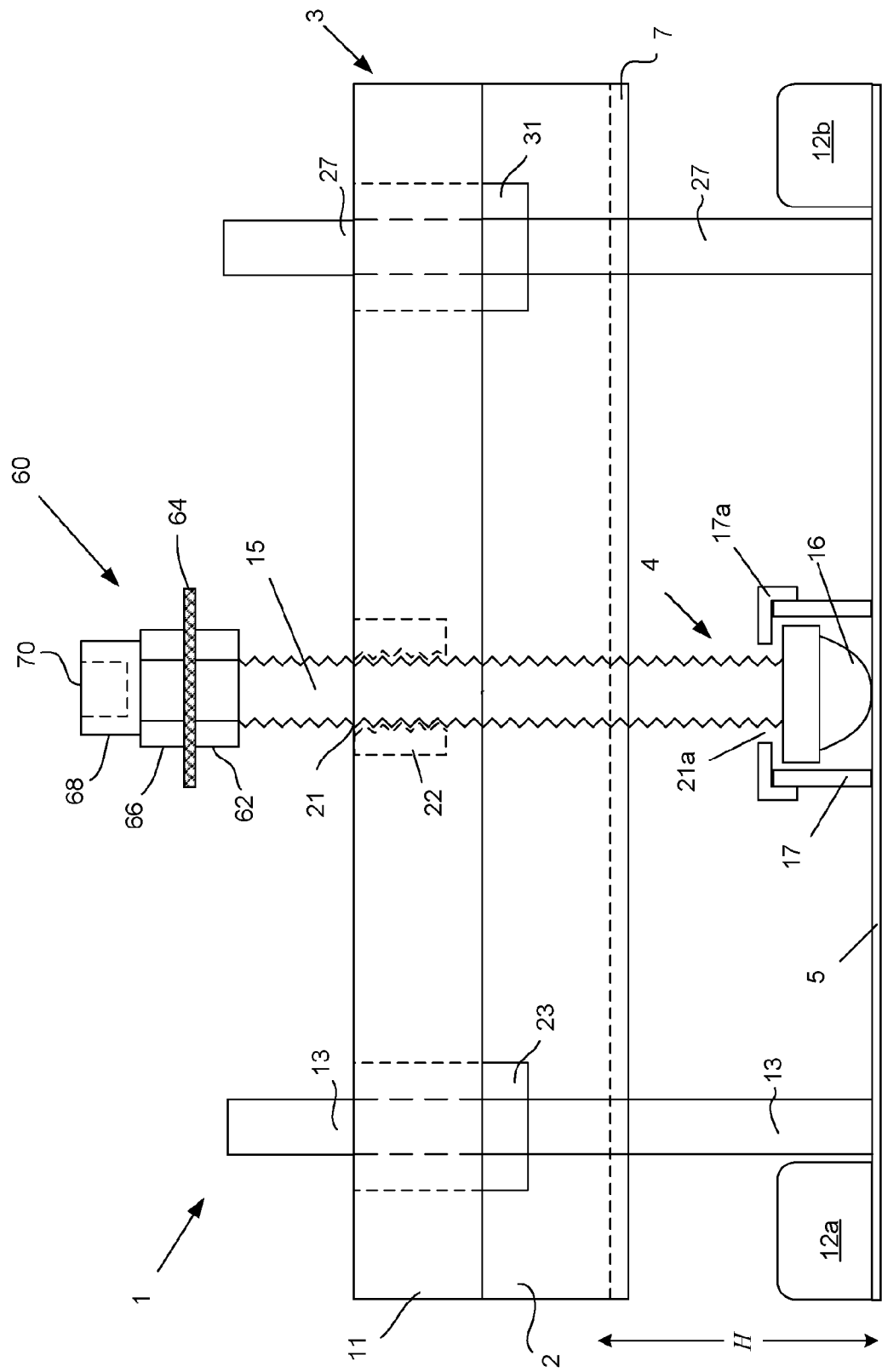

It will be observed that in the configuration shown in FIG. 4 the height between the bottom of the base and the upper surface of the lifting platform 7 is h. By rotating coupling assembly 60, the leadscrew 15 is caused to rotate within the nut 22. Since the nut 22 is fast with the height adjustment bracket 3, which is prevented from rotating by virtue of the guide posts 13, the rotation of leadscrew 15 causes the nut 22, and hence the height adjustment bracket 3, to translate up and down the leadscrew 15 thereby varying the distance between the height adjustment bracket 3 and the base plate 5. FIG. 5 shows the door hanging apparatus 1 subsequent to some rotation of the leadscrew which has resulted in the distance between the lifting platform 7 and the baseplate 5 increasing from h to H.

FIGS. 6 and 7 are partially cutaway cross-sectional side views of the lifting apparatus 1 through the nut 22. In FIG. 6 the leadscrew 15 has been rotated so that the distance between the baseplate and the lifting platform 7 is h whereas in FIG. 7 the leadscrew 15 has been rotated to increase the height of the lifting platform to H. FIG. 7A is a further partial cross-sectional side view of the door hanging apparatus wherein the base and height adjustment bracket have been brought together. It will be realised that in this position, where the base and bracket are made of 3 mm galvanised steel sheet metal, the minimum height "$h_{min}$" between the underside of the base 5 and the top of the platform 7 of the height adjustment bracket 3 is just 6 mm. Consequently the bracket may be lowered down and slid out of even a very small space between the underside of the door and the ground after hanging the door.

Figure 8:
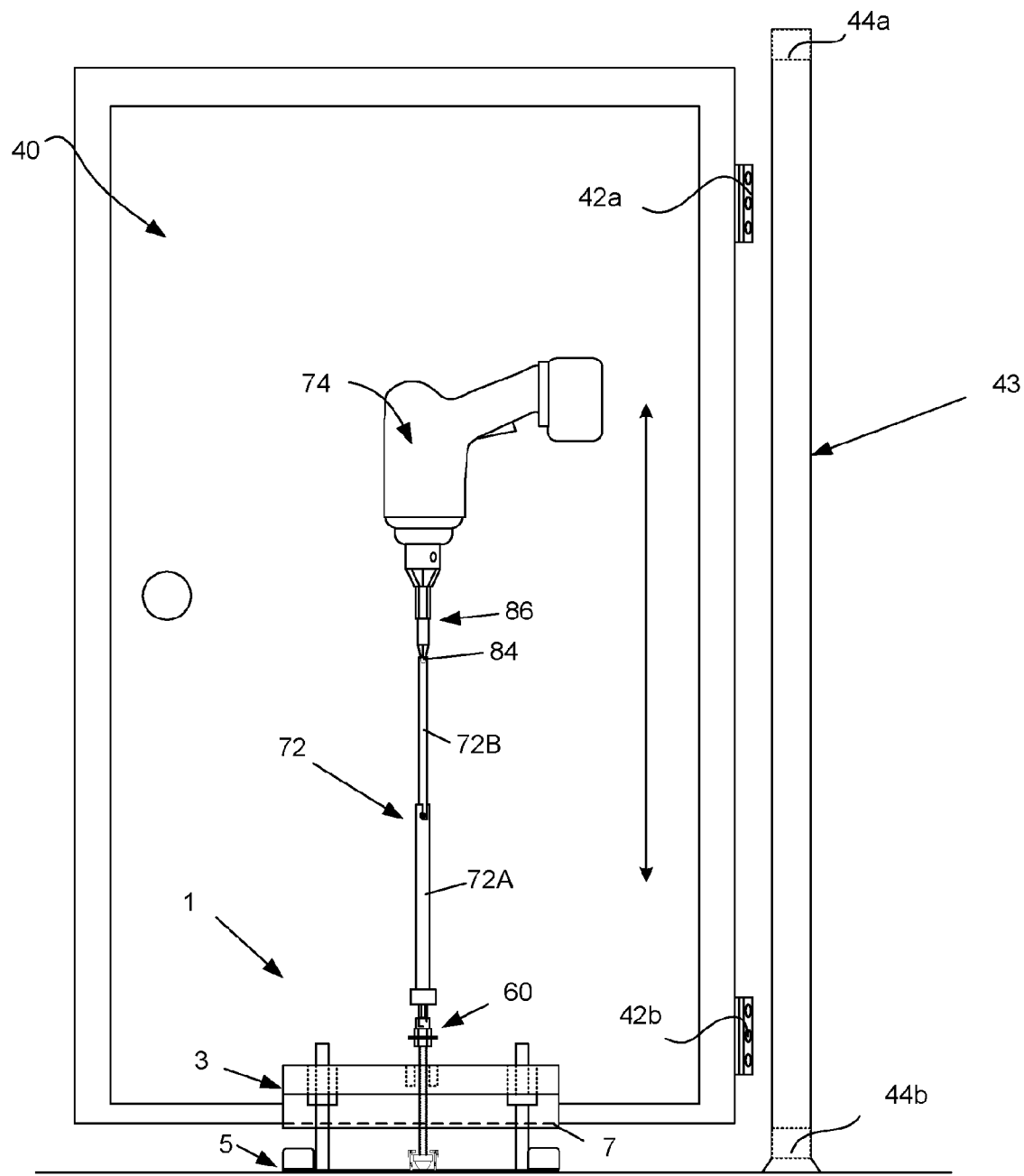
FIG. 8 is a rear view of the apparatus in use whilst hanging a door.
Figure 9:
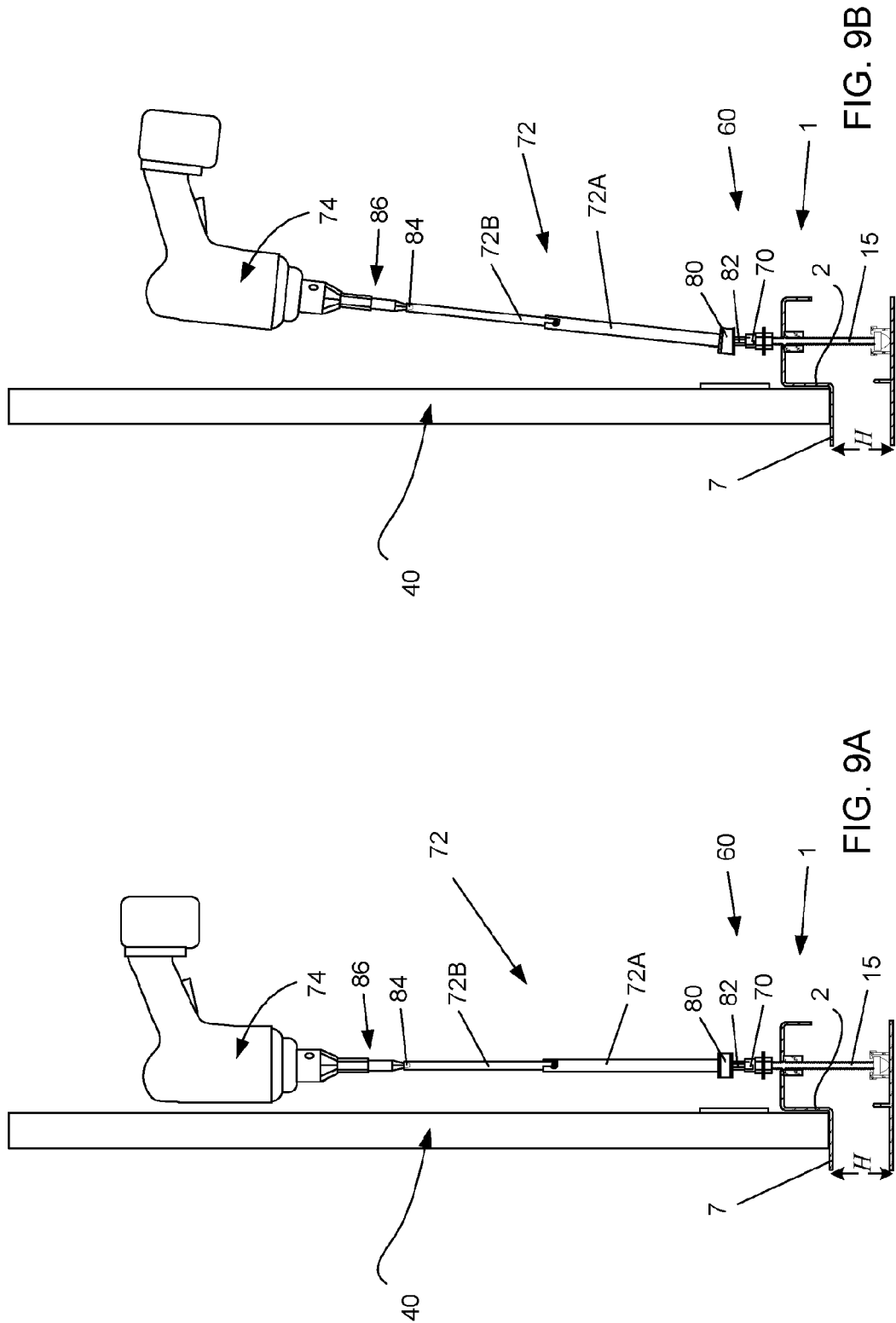
FIG. 9A is a side view of the apparatus in use whilst hanging a door wherein the extension shaft 72 is attached to the leadscrew 15 at an angle via cushioning member 80.
FIG. 9B is a side view of the apparatus in use whilst hanging a door wherein the extension shaft 72 is attached to the leadscrew 15 via cushioning member 80.

FIGS. 8 and 9A, 9B are rear and partially cutaway side views respectively of a view of door hanging apparatus 1 in use. In the view shown in FIG. 8 a door 40 has been placed upon lifting platform 7 of the height adjustment bracket 3 adjacent a door frame 43. The lifting apparatus 1 is located about midway along the underside of the door 40 in order that the door is stably located on the lifting platform 7. As can be seen in FIG. 9A, the underside of the door 40 rests upon the platform 7. The lower edge of the door locates against the door abutment face 2 which assists in stabilising the door as it is raised and lowered during the hanging operation.

Figure 10:
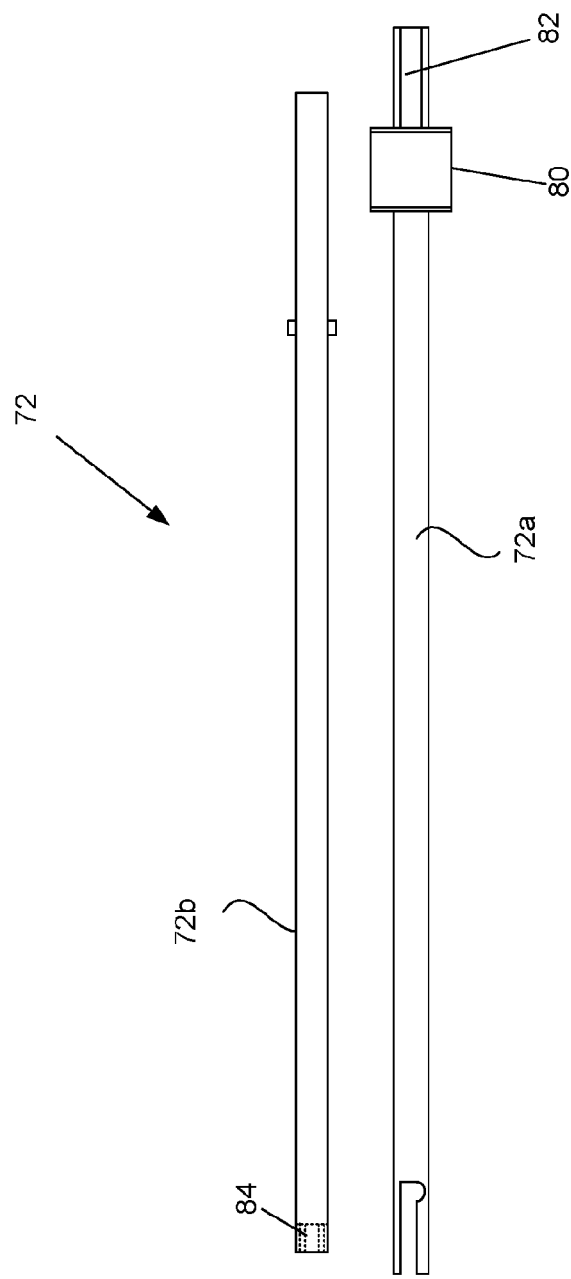
FIG. 10 is a dissembled side view of extension shaft 72.

As shown in FIGS. 8 and 9A, 9B, an extension shaft 72, comprising a lower shaft 72A and an upper shaft 72B has been attached at its lower end to the coupling assembly 60. As best seen in FIG. 10, the lower shaft 72A terminates on a cushioning block 80, which in the present embodiment comprises a cylinder of resilient elastomeric material in the form of synthetic rubber. A rod 82 having a hexagonal cross section extends from the cushioning block 80 for reception in the socket 70 of the coupling assembly 60. The upper end of the upper shaft 72B is formed with a drive socket 84 shaped to receive a drive bit 86. The drive bit 86 is attached to the chuck of a power drill 74 as shown in FIGS. 9A and 9B and in detail in FIG. 12.

It will be realised that the use of an electric drill increases the speed with which the door jack apparatus can be used.

With reference again to FIG. 8, prior to placing the door 40 upon the lifting platform 7 the leadscrew 15 has been rotated to bring the lifting platform 7 to a level wherein the door is roughly in the correct position for hanging to frame 43.

In order to precisely position the door 40 so that its upper edge is brought just below the header 44a of the door frame and thus just above the footer 44b of the frame, the tradesman rotates the lead screw by means of the operator disk 64 or the power drill 74. Once the correct level of the door has been acquired it is a straightforward matter to attach the upper hinge 42a to the jamb of the frame 43. The lower hinge 42b is then similarly attached to the frame 43. The drill 74 is then operated with reverse rotation to lower the upper bracket 3 of the door hanging apparatus 1 so that it can then be removed. It will therefore be realised that embodiments of the present invention provide a door hanging apparatus that allows for fine positioning of the door due to the gradual translation of the upper bracket 3 in response to rotation of the leadscrew 15. Furthermore since an extension shaft 72 or long leadscrew may be provided it is possible for the tradesperson to operate the hanging apparatus with one hand whilst holding the door to be hung with the other. If rotational force is no longer applied to the leadscrew 15 then the door will not lower as is the case with many door jacks of the prior art wherein the door will lower under gravity if the tradesperson ceases to operate the door jack.

The cushion 80 ensures that the drive shaft 72 is able to accommodate substantial off vertical movement absorb shock during operation of the leadscrew by the cordless drill 74. The cushion 80 allows the drive shaft 72 to make an angle with the lead screw 15 whilst being operated by drill 74 as shown in FIG. 9B for example.

Figure 13:
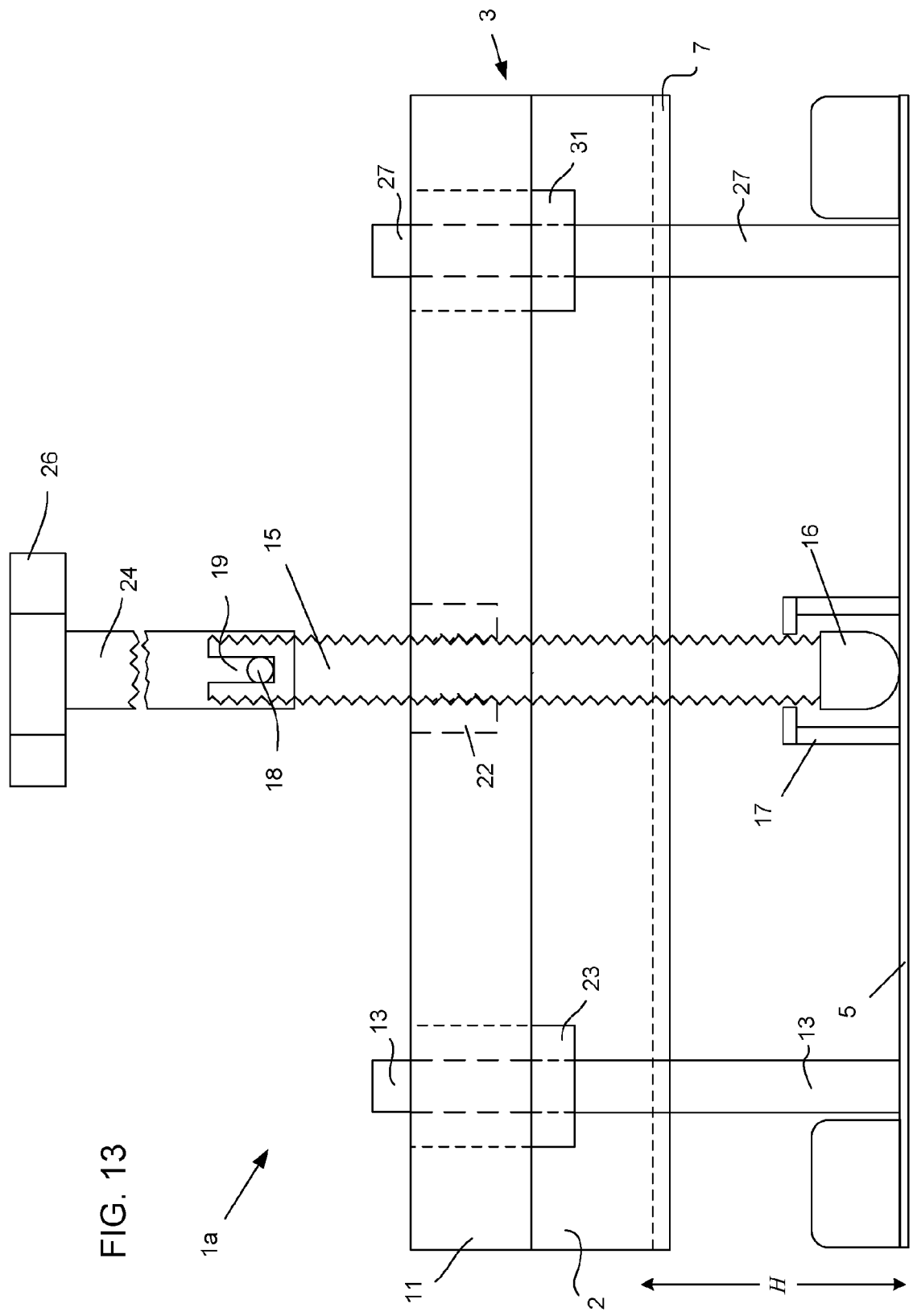
FIG. 13 is a rear view of a door lifting apparatus according to a second embodiment of the invention.
Figure 14:
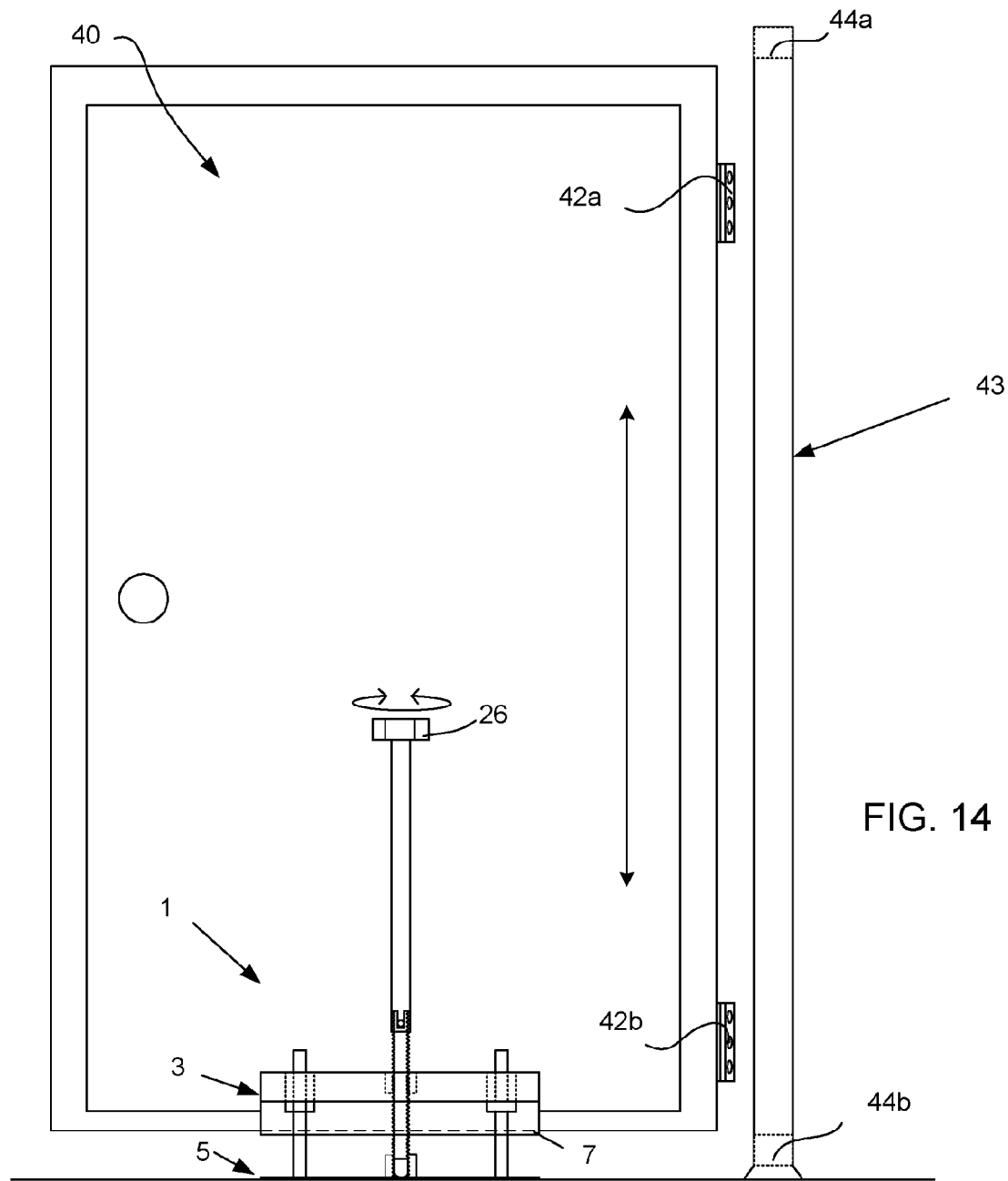
FIG. 14 illustrates the door lifting apparatus of FIG. 13 in use.

FIG. 13 illustrates a door hanging apparatus 1a according to a further embodiment of the invention wherein the top of the leadscrew 15 is formed with a slot 19. An extension shaft 24 has been fitted to the upper end of the leadscrew 15. The extension shaft 24 comprises a hollow rigid tube. Across a lower end the interior of the tube there is disposed a pin 18 so that upon the extension shaft 24 being fitted over the top of the leadscrew as shown in FIG. 4 the pin 18 is received within the slot 19 that is formed through the top of leadscrew 15. Consequently rotation of the extension shaft 24 causes the pin 18 to rotate and in turn to rotate the leadscrew 15. An operator handle 26 is provided fast with an upper end of the extension shaft 24. The extension shaft 24 is shown drawn with a discontinuity in FIG. 4 in order to fit it within the available drawing space. Accordingly, in this embodiment a power drill is not used to rotate the leadscrew 15 but rather it is rotated manually by means of the handle 26 as indicated in FIG. 14, which shows apparatus 1a in use. Preferably the distance from the base plate 5 to the operation handle is at least 40 cm in order that a worker can operate the handle whilst standing without having to unduly stoop. Similarly, the distance from the baseplate 5 to the drive socket 84 in FIG. 8 is about 45 cm for the same reason.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art. Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A door hanging apparatus including:
   a ground contacting base;
   a height adjustment bracket located above the ground contacting base, the height adjustment bracket including a door lifting platform for supporting an underside of a door and a hole through which a leadscrew passes;
   a leadscrew assembly including the leadscrew, the leadscrew assembly interconnecting the ground contacting base and the height adjustment bracket arranged to vary spacing between the ground contacting base and the height adjustment bracket in response to rotation of the leadscrew of the leadscrew assembly; and
   at least two guides extending parallel with the leadscrew from the ground contacting base through respective one or more openings formed through the height adjustment bracket, each guide having a lower fixed end and an upper free end;
   whereby rotation of the leadscrew varies spacing of the height adjustment bracket from the ground contacting base, without pivoting of said height adjustment bracket relative to the ground contacting base, for acquiring a desired level of the door for attachment to a door frame;
   and an upper end of the leadscrew terminates in a coupling assembly;
   and the coupling assembly is attached to an extension shaft assembly, wherein the coupling assembly comprises a cushioning block with the cushioning block including a cylinder of synthetic rubber.

2. The apparatus according to claim 1, wherein the leadscrew assembly includes a thrust collar fast with the base which receives a point of the leadscrew, wherein the thrust collar is fast with the ground contacting base, and wherein the leadscrew is free to rotate within the thrust collar.

3. The apparatus according to claim 2, wherein the point of the leadscrew is capped using a friction reduction cap.

4. The apparatus according to claim 1, wherein the door lifting platform for supporting the underside of a door is located below a point of coupling of the leadscrew assembly to the height adjustment bracket, whereby the leadscrew assembly is operable to bring the door lifting platform down to the ground contacting base.

5. The apparatus according to claim 1, wherein the height adjustment bracket includes a door abutment face extending at an angle from the door lifting platform.

6. The apparatus according to claim 1, wherein the leadscrew is threadedly engaged by a nut fast with the height adjustment bracket.

7. The apparatus according to claim 1, wherein the ground contacting base is rectangular.

8. The apparatus according to claim 1, wherein the at least two guides comprise first and second guideposts with the leadscrew assembly disposed between the first and second guideposts.

9. The apparatus according to claim 8, wherein the first and second guideposts extend through first and second guide collars that are fast with the height adjustment bracket and coaxial with the first and second guideposts.

10. The apparatus according to claim 1, including an operator handle for operation of the leadscrew assembly.

11. The apparatus according to claim 10, wherein the operator handle is fast with an extension shaft, of the extension shaft assembly, that couples to the leadscrew assembly.

12. The apparatus according to claim 10, wherein the operator handle comprises a disk fast with the leadscrew.

13. The apparatus according to claim 1, wherein the extension shaft assembly includes a socket for driving by a power drill.

14. The apparatus according to claim 1, wherein an extension shaft, of the extension shaft assembly, is coupled at an angle to the leadscrew by deforming the cushioning block.

15. The apparatus according to claim 11, wherein the distance from the ground contacting base to the operator handle is at least 40 cm so that a worker is able to rotate the handle whilst standing.

16. The apparatus according to claim 1, wherein the height adjustment bracket includes a top plate and a guard rail extending downwardly from a rear edge of the top plate.

17. The apparatus according to claim 1, including one or more clamp support members extending from the ground contacting base towards the height adjustment bracket and extending along the length of the ground contacting base, for supporting a member to be clamped between the door lifting platform and the ground contacting base.

* * * * *